United States Patent
Pedraza Diaz et al.

(10) Patent No.: US 9,157,164 B2
(45) Date of Patent: Oct. 13, 2015

(54) PART COMPRISING A SUBSTRATE CARRYING A CERAMIC COATING LAYER

(75) Inventors: Fernando Pedraza Diaz, La Rochelle (FR); Baptiste Bouchaud, Saint Sornin (FR); Josseline Balmain, La Rochelle (FR); Gilles Bonnet, La Rochelle (FR); Justine Menuey, Chatellerault (FR)

(73) Assignees: SNECMA, Paris (FR); UNIVERSITE DE LA ROCHELLE, La Rochelle (FR)

( * ) Notice: Subject to any disclaimer, the term of this patent is extended or adjusted under 35 U.S.C. 154(b) by 701 days.

(21) Appl. No.: 13/387,953

(22) PCT Filed: Jul. 29, 2010

(86) PCT No.: PCT/FR2010/051613
§ 371 (c)(1),
(2), (4) Date: Jan. 30, 2012

(87) PCT Pub. No.: WO2011/012818
PCT Pub. Date: Feb. 3, 2011

(65) Prior Publication Data
US 2012/0128934 A1   May 24, 2012

(30) Foreign Application Priority Data
Jul. 30, 2009   (FR) ..................... 09 55368

(51) Int. Cl.
B32B 18/00   (2006.01)
B32B 3/00   (2006.01)
(Continued)

(52) U.S. Cl.
CPC ............. C25D 9/08 (2013.01); B01D 53/9445 (2013.01); B01J 23/10 (2013.01); B01J 35/002 (2013.01);
(Continued)

(58) Field of Classification Search
CPC .... B01D 53/9445; B01J 23/10; B01J 35/002; B01J 37/0225; B01J 37/348; C04B 35/50; C04B 35/58; C08F 4/12; C25D 9/08; Y10T 428/24471
USPC .......................................... 428/155; 204/224
See application file for complete search history.

(56) References Cited

U.S. PATENT DOCUMENTS 4,483,720 A   11/1984   Bartlett et al.
6,042,898 A   3/2000   Burns et al.
(Continued)

FOREIGN PATENT DOCUMENTS

EP   1 013 795   6/2000
GB   2 110 721   6/1983
WO   2007 015692   2/2007

OTHER PUBLICATIONS

International Search Report Issued Nov. 23, 2010 in PCT/FR10/51613 Filed Jul. 29, 2010.
(Continued)

*Primary Examiner* — Maria Veronica Ewald
*Assistant Examiner* — Laura Auer
(74) *Attorney, Agent, or Firm* — Oblon, McClelland, Maier & Neustadt, L.L.P.

(57) ABSTRACT

The invention relates to a part comprising a substrate made of an electron-conducting material and a coating over at least a portion of the surface of the substrate, the coating comprising a ceramic coating layer. In characteristic manner, said coating layer is based on cerium oxides and said coating layer presents oxygen vacancies at a concentration greater than or equal to $1 \times 10^{17}/cm^3$. The invention is applicable to parts for high temperature applications, in particular in the field of aviation.

14 Claims, 4 Drawing Sheets

(51) Int. Cl.
    C25D 9/08      (2006.01)
    B01D 53/94     (2006.01)
    B01J 23/10     (2006.01)
    B01J 35/00     (2006.01)
    B01J 37/02     (2006.01)
    B01J 37/34     (2006.01)
    C08F 4/12      (2006.01)
    C04B 35/50     (2006.01)
    C04B 35/58     (2006.01)
    F01N 3/10      (2006.01)
    H01M 8/12      (2006.01)

(52) U.S. Cl.
    CPC ........... *B01J 37/0225* (2013.01); *B01J 37/348* (2013.01); *C04B 35/50* (2013.01); *C04B 35/58* (2013.01); *C08F 4/12* (2013.01); *B01D 2255/2061* (2013.01); *B01D 2255/2063* (2013.01); *B01D 2255/2065* (2013.01); *B01D 2255/20707* (2013.01); *B01D 2255/20715* (2013.01); *C04B 2235/3229* (2013.01); *C04B 2235/3852* (2013.01); *C04B 2235/762* (2013.01); *C04B 2235/765* (2013.01); *F01N 3/10* (2013.01); *F01N 2510/06* (2013.01); *H01M 8/126* (2013.01); *Y02T 10/22* (2013.01); *Y10T 428/24471* (2015.01)

(56) References Cited

U.S. PATENT DOCUMENTS

| | | | |
|---|---|---|---|
| 6,214,194 | B1 | 4/2001 | Isenberg |
| 2004/0026260 | A1 | 2/2004 | Stoffer et al. |
| 2004/0038085 | A1* | 2/2004 | Litton et al. .................. 428/701 |
| 2004/0175597 | A1* | 9/2004 | Litton et al. .................. 428/702 |
| 2007/0292616 | A1* | 12/2007 | Hazel ............................ 427/337 |
| 2010/0167084 | A1 | 7/2010 | Bhattacharya et al. |

OTHER PUBLICATIONS

Y. Hamlaoui, et al., "Cathodic electrodeposition of cerium-based oxides on carbon steel from concentrated cerium nitrate solutions part I. Electrochemical and analytical characterization", Materials chemistry and physics, 113, 2-3, 2009, pp. 650-657.

* cited by examiner

PART COMPRISING A SUBSTRATE CARRYING A CERAMIC COATING LAYER

The present invention relates to a part comprising a substrate made of an electron-conducting material and a coating on at least a portion of the surface of the substrate, the coating comprising a ceramic coating layer. In particular, the invention relates to a part for high temperature applications, in particular in the field of aviation.

Such a ceramic coating layer is used in particular as a thermal barrier: because of its thermal insulation properties (very low thermal conductivity), it is possible to lower the operating temperature of the underlying substrate by means of a temperature gradient that may exceed 100° C.

Furthermore, metal layers are used either on their own or as an underlayer between the substrate and the ceramic coating layer, for their properties of resistance to corrosion by oxidation when hot, in particular when the metal layers include aluminum which gives rise to a layer of $\alpha\text{-}Al_2O_3$ alumina that provides protection in particular under conditions in which dioxygen is present at a low partial pressure and/or at temperatures higher than 1000° C. under atmospheric pressure. Mention may be made in particular of layers of aluminides and of alloys of the MCrAlY type, where M is a metal selected from nickel, cobalt, iron, or a mixture of these metals. Such oxidation takes place in particular in natural manner in air at high temperatures.

At present, several methods are known for fabricating such ceramic or metallic layers.

The method of deposition by chemical vapor deposition (CVD) is a method of depositing thin films from gaseous precursors. It presents the advantage of being relatively inexpensive and of enabling distribution to be uniform and also of enabling the thickness of the coating layer to be controlled. In contrast, that fabrication method makes use of polluting species (precursors/activators) and it requires subsequent treatment of such waste. In addition, working temperatures are relatively high and the time required for fabricating the coating layer is of the order of several hours, not less than three hours, for applications to thermomechanical parts in fields such as aviation.

The coating layers deposited on substrates by that technique are conventionally layers of aluminides. In order to improve the lifetime and the performance of substrates with their coating layers, proposals have been made in particular to improve the adhesion of the protective oxide layer by plating the aluminide layers in platinum. Nevertheless, platinum is a raw material that is very expensive and platinum plating gives rise to a certain number of additional operations before aluminization, thereby further increasing production costs.

Thermal spraying techniques consist in sending a vector gas that serves to accelerate fine particles (typically having a size of 5 micrometers ($\mu$m) to 100 $\mu$m) and to transport them to the substrate, which particles may be in the liquid, pasty, or even solid state. The vector gas may also be a source of enthalpy, serving to heat the particles up to their melting point (in particular with plasma spraying). In general, spraying techniques are directional, i.e. they send a jet along a linear axis, such that this technique requires automatic systems or expensive post-treatment to be implemented for the purpose of spraying and/or equalizing the sprayed layer on all of the portions of a substrate having a geometrical shape that is complex. In addition, the spraying technique makes use of powders that are fabricated using processes that are polluting, in particular vacuum atomization.

The coating layers deposited on substrates by that technique are conventionally layers of MCrAlY, e.g. FeCrAlY, CoCrAlY, or NiCOCrAlY. In order to be deposited, those layers need to be thermally and chemically compatible with the substrate.

Another known technique consists in adding reactive elements in metallic form to the surface of an alloy or a coating by implanting ions. That relatively expensive technique requires the use of a particle accelerator and of a vacuum enclosure, thereby putting a limit on the size of the parts/substrates that can be implanted and it allows doping to take place at the surface only, to a depth of about 0.05 $\mu$m to 0.5 $\mu$m. The geometry of the parts/substrates must also be simple, essentially plane.

It is also possible to form said layer by applying an aqueous or an organic suspension (a slurry or a sol-gel) forming a paint that may be applied by means of a brush, or by dipping the parts in the paint, which paint is subsequently vaporized. Nevertheless, under such circumstances, binders are used, in particular organic binders and they release volatile elements that might be harmful. In addition, in order to obtain sufficient thickness for the coating layer, it is necessary to apply the suspension on several succession occasions, thereby making the process relatively lengthy to implement, given the intermediate drying steps. Furthermore, it is difficult to apply such a suspension in uniform manner on parts that are complex in shape.

Most proposed protective coatings are expensive and relatively polluting, and they present a lifetime that is limited with increasing service temperatures.

An object of the present invention is to propose an alternative coating that makes it possible to form a thermal barrier and/or a coating that provides protection against hot oxidation phenomena.

It is also sought to provide a coating that presents good adhesion properties.

Another object is to propose a coating that presents properties of capturing harmful and polluting species, thereby making it possible to reduce greenhouse gas emissions.

To this end, the invention provides a part comprising a substrate made of an electron-conducting material and having a coating on at least a portion of the surface of the substrate, the coating comprising a layer of ceramic coating, the part being characterized in that said coating layer is based on cerium oxides and in that said coating layer presents a concentration of oxygen vacancies greater than or equal to $1\times10^{17}$/per cubic centimeter ($cm^3$).

The term "based on cerium oxides" means that the ceramic layer presents cerium oxides as a majority and possibly even as sole constituents, in particular $Ce_2O_3$ and/or $CeO_2$.

Additionally, and optionally, the cerium oxide(s) may be doped and/or stabilized by at least one other oxide of a rare earth element selected from oxides of lanthanides, yttrium, zirconium, and hafnium.

Among the lanthanides, it is preferable to select lanthanum and/or gadolinium, however it is also possible to use some other lanthanide, in particular praseodymium, neodymium, promethium, samarium, europium, terbium, dysprosium, holmium, erbium, thulium, ytterbium, and lutetium.

Such a ceramic coating layer based on cerium oxides serves to provide a coating that forms a thermal barrier and that is capable of providing protection against oxidation phenomena.

The presence of a large number of oxygen vacancies gives access to good resistance to oxidation at high temperature.

In particular, such a ceramic coating layer may constitute a complete coating on its own and without prior deposition of a metallic bonding underlayer.

Preferably, the concentration of oxygen vacancies in the coating layer is greater than or equal to $10 \times 10^{20}/cm^3$.

In a preferred arrangement, said coating layer presents a plurality of cracks opening out into its surface. This characteristic gives a "cracked mud" morphological appearance to the surface of the coating layer.

By way of example, the distance between two adjacent cracks lies in the range 5 µm to 50 µm. Preferably, said cracks present a width l lying in the range 1 µm to 25 µm.

The presence of such cracks gives the surrounding oxygen limited access through the coating layer down to the substrate, and it enhances the reduction in the thermal conductivity of the coating layer.

In a preferred arrangement, said coating layer presents thickness of at least 5 µm and of no more than 100 µm.

Furthermore, and preferably, said coating layer comprises:
in the range 0.5 atomic percent (at %) to 35 at % cerium oxides;
in the range 0.5 at % to 75 at % oxygen; and
in the range 0.5 at % to 30 at % nitrogen.

According to another preferred arrangement, in addition to a majority of cerium oxide, the coating layer includes one, two, or more additional oxides selected from the group comprising oxides of lanthanides, of yttrium, of zirconium, and of hafnium.

Preferably, said substrate is formed in a material belonging to the group comprising superalloys, nickel-based superalloys, cobalt-based superalloys, titanium and alloys thereof, intermetallic compounds based on aluminides and/or silicides, metallic matrix composites, ceramic matrix composites, and organic matrix composites.

If the substrate is based on aluminide(s), one of the following aluminides or a mixture of them is/are selected in particular: nickel, cobalt, iron, titanium, ruthenium, and platinum aluminide. If the substrate is based on silicides, one of the following silicides or a mixture thereof is/are selected in particular: molybdenum silicide and iron silicide.

In an advantageous arrangement, said substrate includes aluminum and the coating includes a layer of alumina between the substrate and the coating layer.

Other characteristics and advantages of the invention appear better on reading the following description given with reference to the accompanying drawings, in which.

In a possibility that is given by way of preferred example of the method of fabricating the ceramic coating layer covering at least a portion of the surface of the substrate forming the part, the coating layer is deposited on the substrate solely by a cathodic electrodeposition (CELD) process between at least a cathode and an anode. It should be understood that the substrate is made of a material that conducts electrons and that it constitutes the cathode. In order to obtain the composition of the ceramic coating layer of the invention, the electrolyte includes at least one cerium salt such that the electrodeposition process forms the coating layer on the basis of cerium oxides.

This method serves to form a coating layer either directly on the substrate constituting the material of the part, or else on an underlayer covering the part and then constituting the substrate that is to be covered.

It is also possible to cover a portion of the surface of the substrate, e.g. by using a mask in the zone(s) where it is not desired to deposit the coating layer, or else by performing electrodeposition locally.

In one possible arrangement, said electrolyte includes at least two salts including the cerium salt and at least one other salt selected from the group comprising the salts of lanthanides, of yttrium, of zirconium, and of hafnium, such that the electrodeposition process causes the coating layer to comprise a base of cerium oxides together with at least one other oxide selected from the group comprising the oxides of lanthanides, of yttrium, of zirconium, and of hafnium.

In this way, oxyhydroxides of a mixture of rare earths are codeposited in a single step (e.g. of cerium and lanthanum, or indeed of cerium and lanthanum and gadolinium, etc.).

Such a method of fabricating a coating layer of the invention is particularly ecological and economic (short implementation time, performed under atmospheric pressure avoiding the use of vacuum equipment) compared with vapor deposition techniques or thermal spraying techniques. In this way, it is possible to coat parts that have not previously been coated.

Furthermore, implementing this fabrication method is compatible with parts that have holes: the geometry of current lines prevents any significant deposition taking place inside the holes, in particular inside cooling holes of small size, which holes are thus not obstructed.

Also, it should be observed that the use of such a method avoids having recourse to dangerous chemicals and avoids producing toxic waste.

Figure 1:
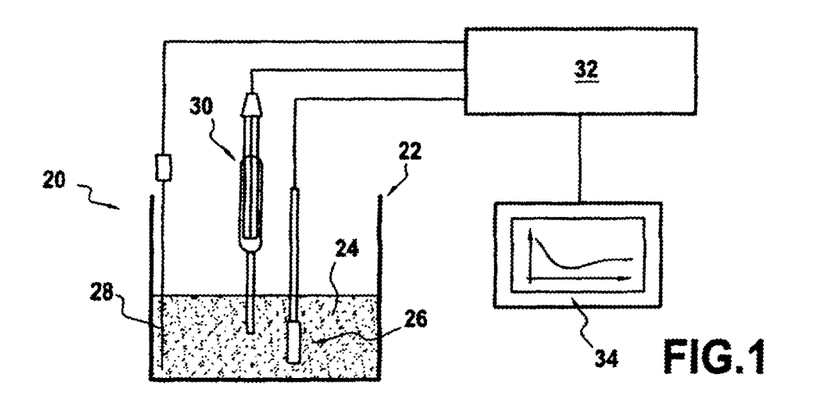
FIG. 1 is a diagram of a setup suitable for use in implementing a preferred method of fabricating the coating layer of the invention.

The electrodeposition installation 20 that may be used comprises a single vessel 22 filled with electrolyte 24 into which the part forming the substrate for covering is dipped and serves as a cathode 26 (working electrode).

An anode 28 (or counter-electrode) is also immersed in the electrolyte 24. The anode 28 is constituted by a material that is chemically inert relative to the electrolyte bath (electrolyte), e.g. in the form of a platinum grid, and it is positioned in such a manner as to create current lines that are uniform at the substrate (cathode 26).

Advantageously, the electrodeposition process also uses a reference electrode 30 that is placed close to the cathode 26 so as to minimize the effects of the resistance of the electrolyte 24 and so as to provide better control during electrodeposition. This reference electrode 30 is preferably constituted by a saturated calomel electrode (SCE), where calomel is mercurous chloride $Hg_2Cl_2$.

This three-electrode electrodeposition installation 20 enables current density and voltage to be tracked accurately in situ, while simultaneously making the coating layer.

The three electrodes (cathode 26, anode 28, and reference electrode 30) are connected to an electric current source 32 that is coupled to a control and data acquisition system 34.

In a first alternative, the potentiostatic mode is used in which the electric current source 32 imposes a potential (or voltage) between the anode 28 and the cathode 26. Under such circumstances, the electric current source 32 is a potentiostat and the electrodeposition process is performed by applying a voltage between the cathode 26 and the anode 28. The voltage applied between the cathode 26 and the anode 28 preferably lies in the range −30 volts (V) to +30 V, and more preferably lies in the range −2.5 V to +2.5 V.

In a preferred, second alternative, the galvanostatic mode is used, in which the electric current source 32 imposes a current density between the anode 28 and the cathode 26. Under such circumstances, the electric current source 32 is a galvanostat and the electrodeposition process is performed by applying a current density between the cathode 26 and the anode 28. The current density applied between the cathode 26 and the anode 28 preferably lies in the range −0.5 milliamps per square centimeter (mA/cm²) to −5 mA/cm², and more preferably in the range −0.5 mA/cm² to −2 mA/cm².

The electrolyte contains the one or more species for depositing on the cathode in the form of salts dissolved in the electrolyte 24. Applying a current density or an electric potential serves to reduce the species with which the ceramic coating layer is to be formed at the interface (diffusion layer) between the volume of electrolyte and the surface of the cathode 26 (substrate).

It is possible to obtain characteristics that are uniform or that present a gradient across the thickness of the deposit (in terms of composition, microstructure, crystallographic characteristics, . . . ).

The salts comprise one or more anionic and/or cationic species, in particular nitrates, sulfates, chlorides, or acetate, with a preference for nitrates. Thus, the electrolyte preferably comprises nitrate salts, in particular cerium nitrate, at a concentration greater than or equal to 0.05 moles per liter (mol/L). It is possible to provide for the nitrate salts to be at a concentration greater than or equal to 0.1 mol/L.

The one or more cationic species of the electrodeposited coating layer comprise any combination including cerium in the majority, i.e. essentially or solely a species based on cerium or and optionally one or more other species belonging to the group constituted by species in the lanthanide series, by yttrium, by zirconium, and by hafnium. The use of lanthanum or of gadolinium is also advantageous.

The electrolyte 24 presents a composition and a concentration that depend on the quantity of salt dissolved in the solvent. In particular, the electrolyte 24 presents high ionic conductivity, lying in the range 25 millisiemen square meters per mol (mS·m²/mol) to 1000 mS·m²/mol, and preferably in the range 150 mS·m²/mol to 500 mS·m²/mol.

The electrolyte 24 is a relatively concentrated solution of one or more salts essentially containing salts of cerium and optionally one or more other salts selected from lanthanides and/or yttrium and/or zirconium and/or hafnium. Thus, provision is made for the total concentration of the electrolyte 24 to lie in the range 0.05 mol/L to 5 mol/L.

Preferably, the cerium salts (alone or in the presence of salts of lanthanides, yttrium, zirconium, and hafnium) are initially in the electrolyte at a concentration lying in the range 0.05 mol/L to 5 mol/L, and more preferably in the range 0.1 mol/L to 0.3 mol/L.

The solvent of the electrolyte 24 is aqueous-based, or a solution of alcohol (ethanol), or indeed is based on cetone, ester, or aldehyde, or indeed a mixture of two of them. It is preferred to use an electrolyte with an aqueous-based solvent since that is less polluting and easier to regenerate.

Preferably, the temperature of the electrolyte 24 lies in the range 4° C. to 100° C., and more preferably in the range 15° C. to 25° C. (ambient temperature) in order to avoid high levels of evaporation and in order to consume less energy for maintaining the temperature of the electrolyte 24. In addition, such a temperature range makes it possible to obtain crystal sizes and a concentration of oxygen vacancies that are optimized for applications against high temperature oxidation and/or thermal barrier applications.

Preferably, the pH of the electrolyte 24 is less than 7, and it may be clearly acidic, lying in the range 2.5 to 5.5.

In additional but non-essential manner, the electrolyte 24 may also include one or more additives and/or surfactants.

The vessel 22 containing the electrolyte and the three electrodes 26, 28, and 30 is in contact with ambient air at atmospheric pressure. The vessel 22 is immersed relative to the electrolyte 24. It is possible for the electrolyte 24 to be stirred lightly.

Electrodeposition preferably does not last more than 1 hour (h). This duration preferably lies in the range 10 minutes (min) to 30 min, and more preferably in the range 15 min to 25 min. Thus, this fabrication method can be implemented relatively quickly.

During the electrodeposition, one or more reduction reactions (1) to (4) are obtained, serving to produce hydroxyl ions OH⁻, in particular from the oxygen $O_2$ and the water $H_2O$ of the electrolyte 24:

$$2H_3O^+ + 2e^- \rightarrow H_2 + 2H_2O \quad (1)$$

$$2H_2O + 2e^- \rightarrow H_2 + 2OH^- \quad (2)$$

$$O_2 + 2H_2O + 4e^- \rightarrow 4OH^- \quad (3)$$

$$O_2 + 2H_2O + 2e^- \rightarrow 2OH^- + H_2O_2 \quad (4)$$

Sometimes, the anions of the salt may contribute to cathode reactions. Thus, in particular with nitrates, the equations are as follows:

$$NO_3^- + 10H^+ + 8e^- \rightarrow NH_4^+ + 3H_2O \quad (5)$$

$$NO_3^- + H_2O + 2e^- \rightarrow NO_2^- + 2OH^- \quad (6)$$

Since the electrolyte 24 presents an acid pH, the presence of $H_3O^+$ cations and the formation of hydroxyl ions OH⁻ (base) may also contribute to forming compounds containing the base and the cations to be deposited.

Thus, for the particular circumstance of cerium cation and hydroxyl anion species, the formation of $Ce(OH)_3$ and/or of $Ce(OH)_2^{2+}$ is encouraged, in particular by reactions (7) to (9):

$$Ce^{3+} + 3OH^- \rightarrow Ce(OH)_3 \quad (7)$$

$$4Ce^{3+} + O_2 + 4OH^- \rightarrow 2H_2O + 4Ce(OH)_2^{2+} \quad (8)$$

$$2Ce^{3+} + 2OH^- + H_2O_2 \rightarrow 2Ce(OH)_2^{2+} \quad (9)$$

Finally, oxidation and/or partial dehydration of the electrodeposited compounds may occur. In the specific circumstance of species including cerium, $Ce^{3+}$ may be oxidized to $Ce^{4+}$:

$$Ce(OH)_3 \rightarrow CeO_2 + H_3O^+ + e^- \quad (10)$$

$$Ce(OH)_2^{2+} \rightarrow CeO_2 + 2H_2O \quad (11)$$

The coatings are thus formed by basic electro-generation, by reaction with the cationic species present in the electrolyte, either by electro-crystallization or by precipitation.

The coating layer results form the initial formation of a film having the general composition $T(OH)_{z-x}(L)_x, YH_2O$ where:

T (rare earth) belongs to the group comprising lanthanides, yttrium, zirconium, and hafnium;

L is a ligand (such as nitrate or any other anion);

z is the number of positive charges of the starting salt;

x is the number of negative charges of the ligand; and

Y is the number of water molecules.

In another arrangement that is preferred, but optional, the fabrication method also includes a step of drying the coating layer. Such a step is preferably performed at ambient temperature for at least 24 h, and preferably up to 48 h.

More precisely, once electrodeposition is terminated, the coated parts may optionally be rinsed using various solvents (water, alcohol, cetone, ester, aldehyde) and then optionally dried with a stream of cold or hot air or of some other gas at a power that is sufficiently low to avoid completely detaching the coating from the substrate, or the parts may be stored for a certain duration in an enclosure in the presence of a hygroscopic substance, or any other method may be used, e.g. air conditioning, so as to cause at least part of the moisture in the coating to evaporate. The preferred method is rinsing in alcohol followed by a first drying step using a light stream of hot air followed by a second drying step by storage under reduced pressure (in a desiccator and preferably for at least 24 h).

In another arrangement that is preferred, but optional, possibly after a drying stage, the fabrication method also includes a heat treatment drying step that is applied to the coating layer at a high temperature, preferably lying in the range 400° C. to 2000° C. for a duration of at least 10 min.

The pressure in the enclosure may be atmospheric or lower. The gaseous atmosphere in the enclosure may be completely or partially oxidizing and/or inert and/or reducing, but must not include any corrosive substance such as $SO_2$, HCl, etc., that could give rise to a substance being formed in the coating and that contains species other than oxygen, nitrogen, carbon, cerium, other lanthanides, yttrium, zirconium, hafnium, or any combination of these species (in neutral, cationic, anionic, covalent, or metallic form).

Under such circumstances, and preferably, the heat treatment is performed under argon at atmospheric pressure in the presence of at least 0.0001 bar of oxygen, and preferably for a duration of 60 min at 1050° C. Under such circumstances, use is preferably made of rising and falling temperature ramps at 5 degrees Celcius per minute (° C./min).

Such additional heat treatment of the part coated in the coating layer makes it possible to modify and adapt specifically the composition, the microstructure, the crystal structure, and/or the thickness of the coating layer. Such adaptation serves to improve the property(ies) corresponding to the intended application, such as ability to withstand cyclic oxidation, ability to withstand isothermal oxidation, a reduction in thermal conductivity, reduced dependence on the presence of a layer of alumina obtained by natural oxidation, and greater ability to withstand deposits of molten salts or "CMAS" (for "CaO—MgO—$Al_2O_3$—$SiO_2$", i.e. oxide compositions containing oxides of calcium, magnesium, aluminum, and silicon, and mixtures of such oxides, resulting from the engine ingesting sand and/or any other debris coming from the upstream portion of the engine).

In this way, a deposit of a coating layer is obtained in the form of a compound of a nature that is ceramic (and not metallic, since metallization is not involved as it is in the phenomenon that results from conventional electrodeposition).

The coating layers obtained present a composition based on cerium oxides (optionally associated with one or more oxides of lanthanides and/or yttrium and/or zirconium and/or hafnium) containing a varying quantity of water (metallic oxyhydroxides), and also including hydroxyl anions or any other anion produced from the salts and the solvents.

Thus, in addition to cerium oxide, and optionally some other oxide belonging to the group constituted by oxides of lanthanides and excluding cerium, of yttrium, of zirconium, and of hafnium, the coating layer also includes at least one metallic hydroxide of formula $M_x(OH)_y$ (where M is cerium and/or optionally some other lanthanide metal, yttrium, zirconium, and/or hafnium, $\underline{x}$ is the negative charge of the hydroxyl anion ($OH^-$), and $\underline{y}$ is the number of positive charges of the lanthanide metal, yttrium, zirconium, and/or hafnium) and at least one hydroxyl anion ($OH^-$).

More specifically, the coating layer, after drying and/or heat treatment, comprises a metallic oxyhydroxide of formula MO.OH in which M is cerium and/or optionally some other lanthanide metal, yttrium, zirconium, and/or hafnium.

The coating layers may present a varying composition that contains, in addition to the base of cerium oxide, one or more elements from the group constituted by lanthanides, yttrium, zirconium, and hafnium; but also oxygen, nitrogen, carbon (or any other species contained in the counter-ion of the electrolyte); together with nickel and/or aluminum and/or chromium and/or cobalt and/or titanium and/or tungsten and/or tantalum and/or molybdenum and/or rhenium and/or ruthenium and/or niobium and/or silicon and/or iron and/or manganese and/or platinum and/or palladium and/or iridium.

The coating layers obtained by the preferred fabrication method may have a structure that is amorphous and/or crystalline and/or nanometric (elements having size of nanometer order). In general, the coating layers present a minimum percentage of crystalline phase with crystals having a size in the nanometric range.

Furthermore, said coating layer usually presents a microstructure that is needle-shaped and/or nodular.

Depending on the parameters selected for electrodeposition, the coating layers of the invention present properties of withstanding high temperature oxidation and/or a thermal barrier effect and/or an effect of capturing harmful species.

Under all circumstances, a specific morphology, consisting in a so-called "dry mud" earthenware microstructure containing pores (and optionally cracks) may be observed on the outside face of the coating layer as obtained by the preferred fabrication method (FIGS. 2 to 6).

Figure 2:
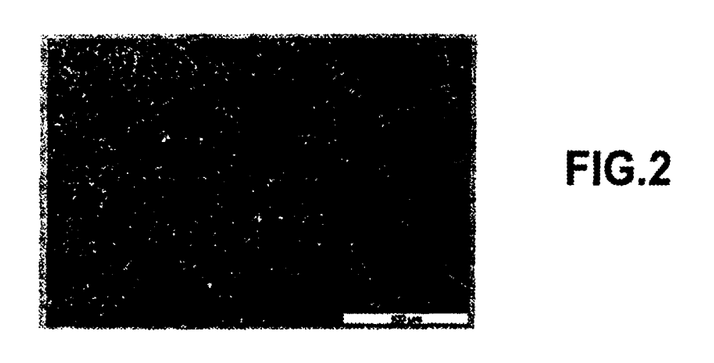
FIGS. 2 to 4 are micrograph views of the surface of a coating layer obtained by the preferred method of fabricating the coating layer of the present invention, while using different current densities.
Figure 3:
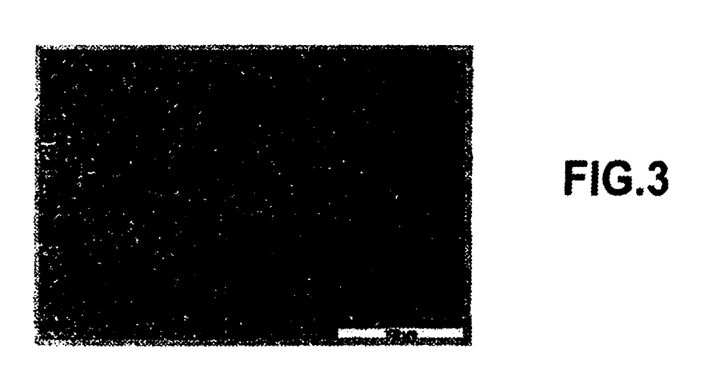
Figure 4:
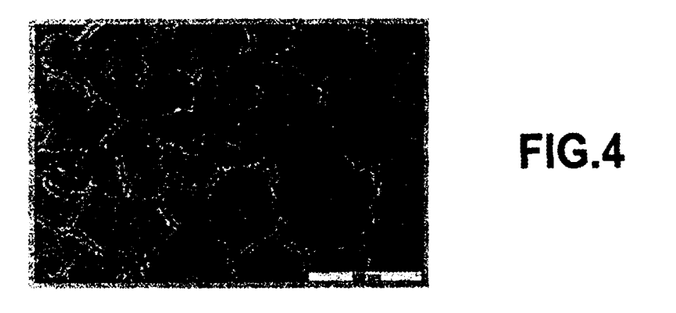

As can be seen in FIGS. 2 to 4 that show the surface of a coating layer formed solely with a cerium oxide base (and with drying), for different current densities that increase from FIG. 1 to FIG. 4, it is possible to obtain different morphologies (−0.5 mA/cm$^2$ for FIG. 2, −1 mA/cm$^2$ for FIG. 3, and −1.5 mA/cm$^2$ for FIG. 4).

In addition, increasing the current density used causes cracks to appear (FIGS. 3 and 4) of size (length, width, and depth) that increases.

Varying the current density also modifies the composition at the surface of the coating layer: applying a lower current density gives rise to a higher concentration of substrate elements present in the coating, since it presents a smaller thickness compared with higher current densities, particularly with nickel for substrates that are based on nickel alloy.

The thickness of the deposit also increases with the applied current density and with the deposition time.

A maximum of 35 at of rare earths has been observed when using maximum current densities.

Figure 5:
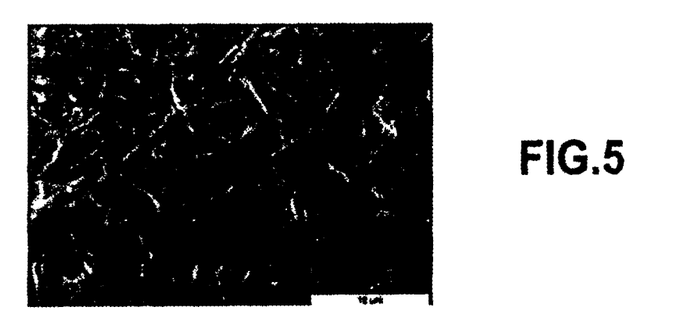
FIGS. 5 and 6 are micrograph views of the surface of a coating layer of the present invention obtained by the preferred method of fabrication, while using different formulations of salts contained in the electrolyte.

FIG. 5 also shows a coating layer formed solely on the basis of cerium oxides, the greater magnification revealing the tangling of the needle-shaped structures on the outside face of the coating layer. The term "needle-shaped structure" means a structure in which the micrographic constituents appear to have a needle shape in a metallographic section, as a result of the presence of a morphology that is elongate in a privileged direction in three dimensions for the elements making up the structure.

Figure 6:
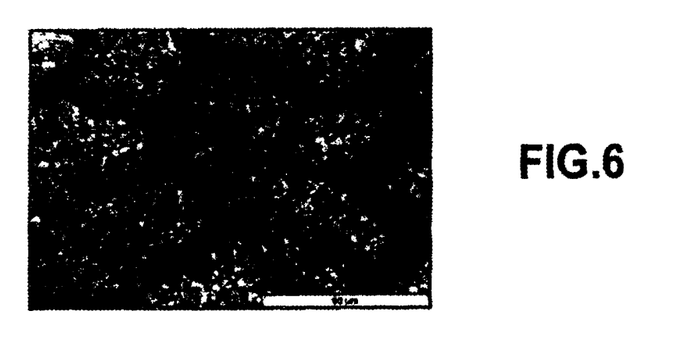

In comparison, FIG. 6 shows that for a coating layer made using a mixed oxide (specifically oxides of cerium and of gadolinium), a nodular microstructure can appear on the outside face of the coating layer. The term "nodular microstructure" is used to mean the presence of micrographic constituents that are of an irregular round shape, as a result of the presence of a rounded morphology without preferential lengthening of the elements making up the structure.

The coating layer of the present invention resulting from the above-described fabrication method grows layer by layer and presents a certain number of particularities.

In particular, the coating layer presents a considerable concentration of oxygen vacancies, in particular a concentration of oxygen vacancies that is greater than or equal to $1 \times 10^{17}$ vacancies per cubic centimeter (vacancies/cm$^3$), and preferably greater than or equal to $10 \times 10^{20}$ vacancies/cm$^3$.

In addition, the coating layer presents a porous structure with a plurality of open cracks.

In the context of the present invention, the presence of such cracks is desired since they perform several roles. In particular, the presence of cracks makes it possible to avoid the coating layer (having a ceramic nature) from detaching from the substrate (generally having a metallic nature) as a result of different coefficients of thermal expansion, in particular during thermal cycling. Furthermore, the presence of such cracks provides the surrounding oxygen with limited access through the coating layer down to the substrate.

Furthermore, since the resulting coating layer presents pores and cracks, an additional reduction is obtained in the already-low thermal conductivity of this type of ceramic.

In particular, the distance between two adjacent cracks lies in the range 5 µm to 50 µm, and said cracks present a width l lying in the range 1 µm to 25 µm.

Most of the time, and in particular when either the substrate or the coating layer includes aluminum, a fine layer of protective oxide (in particular a layer of alumina) is formed at the interface between the coating layer and the substrate, thereby providing protection against oxidation or against hot corrosion. Such a protective oxide layer can be generated by oxidation of the substrate. The protective oxide layer contains aluminum, rare earths (cerium and optionally lanthanides and/or yttrium and/or zirconium and/or hafnium), and oxygen.

This coating layer presents thickness of at least 5 µm.

With additional heat treatment of the part coated in the coating layer, the coating layer is dehydrated, thereby enabling the microstructure and/or the thickness and/or the composition of the coating layer to be modified.

In particular, with relatively moderate heat treatment temperatures, in particular temperatures of less than 900° C., the earthenware microstructure is maintained, the crystal structure is defined to a greater extent, the thickness of the deposit decreases, the surface concentration of rare earth decreases, and the elements of the substrate rise into the coating layer.

Figure 7:
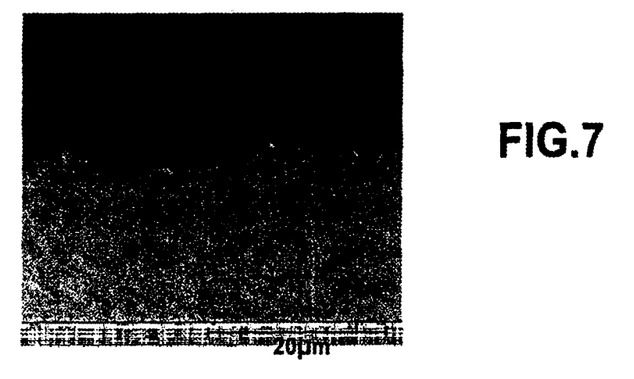
FIGS. 7 to 9 are micrograph sections showing the coating layer deposited on the surface of the substrate, respectively without heat treatment, with first heat treatment, and with second heat treatment.

Thus, FIG. 7 is a section view of a coating layer obtained by the above-described fabrication method, formed solely on the basis of cerium oxides $CeO_{2-x}$, on a substrate of the monocrystalline superalloy type based on nickel, and without heat treatment.

Figure 8:
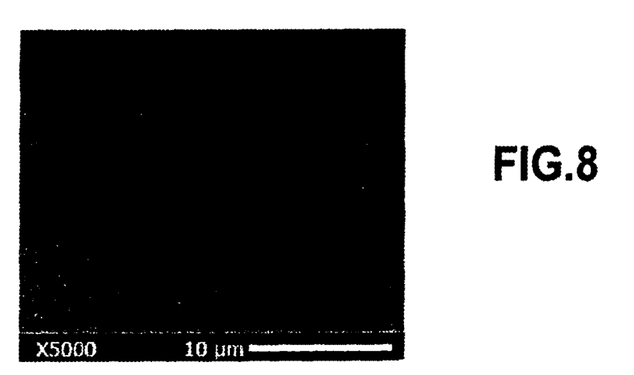

FIG. 8 shows the same coating layer as FIG. 7, but after heat treatment at a moderate temperature (typically 900° C. for 1 h) at the end of which the thickness has decreased and the needle-shaped microstructure is maintained.

If higher temperatures are used for heat treatment, in particular temperatures higher than 900° C., the microstructure becomes nodular, the thickness of the deposit decreases even more, and the oxide layer that develops at the interface is thicker.

Figure 9:
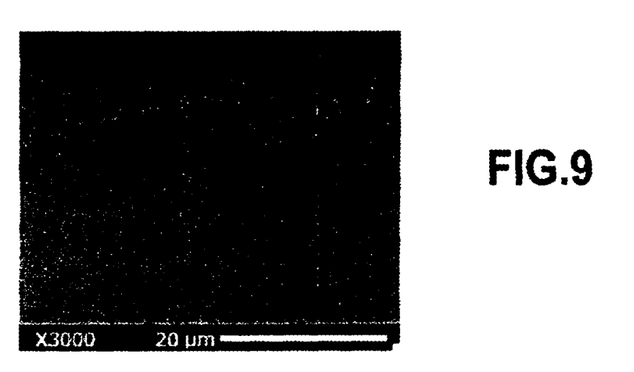

Thus, FIG. 9 shows the same coating layer as FIG. 7, after heat treatment at high temperature (specifically 1050° C. for 1 h) at the end of which the thickness of the coating layer has decreased and a nodular microstructure has appeared.

In order to promote the formation of the protective oxide layer, an oxidizing atmosphere is used for performing the treatment. It is therefore preferred to perform heat treatment under a reduced pressure of air.

For this purpose, in a preferred heat treatment, the part coated in the coating layer is placed in an enclosure at ambient temperature, which enclosure is then evacuated down to $5 \times 10^{-2}$ millibar (mbar), prior to raising the temperature at a rate of 5° C./min under a stream of argon at atmospheric pressure up to 1050° C., heat treatment being performed at that temperature for one hour under argon at a pressure of 1 bar, and then the temperature is lowered at a rate of 5° C./min under a stream of air down to ambient temperature. That constitutes the treatment performed under argon, at a reduced pressure of oxygen (residual oxygen present at least 0.0001 bar) in order to encourage oxidation.

The coating layer of FIG. 9 has been subjected to such heat treatment.

Figure 10:
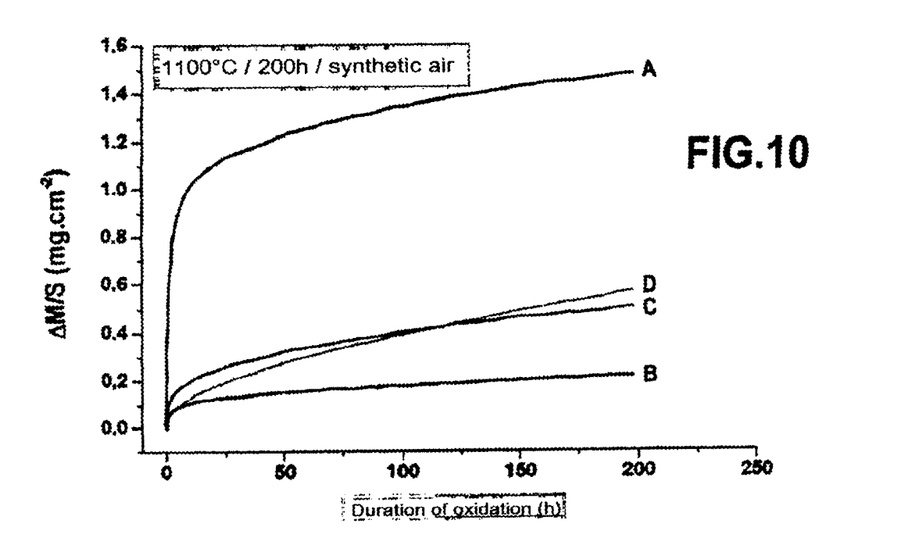
FIG. 10 shows the isothermal oxidation behavior of a bare substrate and of a substrate coated with various alternatives, as obtained by thermogravimetric analysis.
Figure 11:
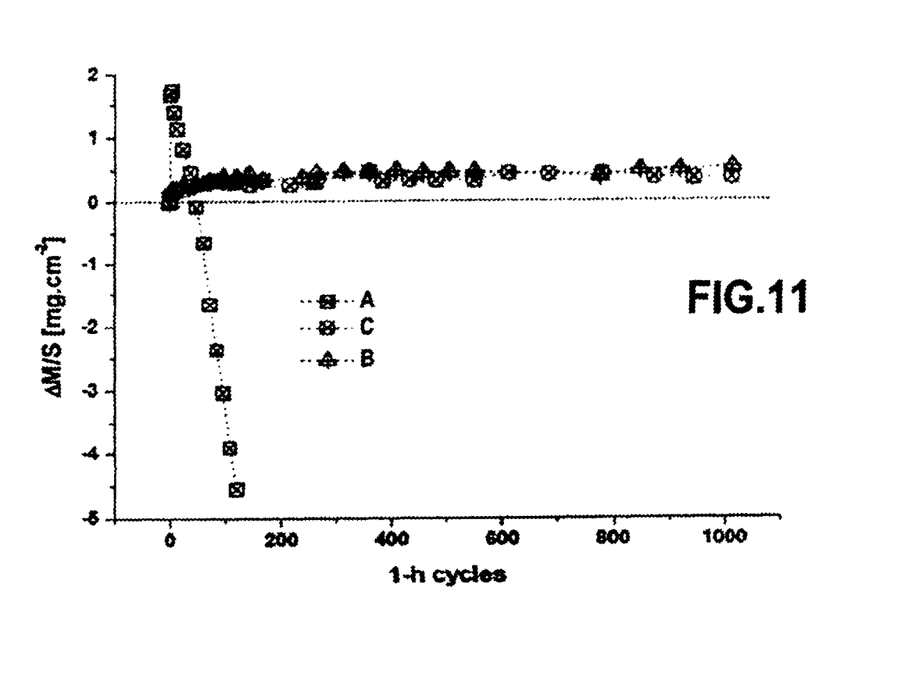
FIG. 11 shows the cyclic oxidation behavior of a bare substrate and of a substrate coated with various alternatives, as obtained by gravimetric analysis.

Reference is now made to FIGS. 10 and 11 that show respectively isothermal oxidation performance and cyclic oxidation performance for a bare substrate and for a substrate coated in various alternative ways. In FIG. 10, the gain in weight per unit area expressed in milligrams per square centimeter (mg·cm$^{-2}$) is measured as a function of oxidation time at 1100° C. under air at atmospheric pressure. In FIG. 11, the gain in weight per unit area (mg·cm$^{-2}$) is measured as a function of the number of cyclic oxidation cycles at 1100° C. under air at atmospheric pressure.

The curves A relate to a bare substrate of a nickel-based monocrystalline superalloy type. The curves B relate to the same substrate coated in nickel aluminide deposited by the vapor phase aluminizing (VPA) technique (aluminized substrate). The curves C relate to the same substrate coated in a coating layer made up of cerium oxides obtained by cathodic electrodeposition and heat treatment. Finally, in FIG. 10, the curve D relates to a part having the same substrate coated in an underlayer of nickel aluminide covered in a coating layer made up of cerium oxides obtained by cathodic electrodeposition and heat treatment.

In FIGS. 10 and 11, it can be seen that the coating layer (curve C) confers protection against high temperature oxidation (whether isothermal or cyclic) that is similar to that conferred by aluminizing (curve B). This significantly reduces the kinetics of oxidation compared with a bare substrate (curve A).

The presence of oxygen vacancies makes this resistance to high temperature oxidation possible by contributing to forming the protective oxide layer (in particular of alumina) at the interface between the coating layer and the substrate, this oxide layer subsequently partially preventing oxygen from entering into the interface.

It is during this formation of the alumina layer, by oxygen entering via the vacancies, that the greater gain in weight occurs that can be seen for curve C compared with curve B.

In FIG. 11, it can be seen that the resistance to cyclic oxidation is also good with the coating layer (curve C) and with the aluminization layer (curve B), and that it is much better than the resistance of a bare substrate.

The microstructure has been observed to vary, with a nodular microstructure appearing during isothermal oxidation (FIG. 10) or during cyclic oxidation (FIG. 11).

It should be observed that it is possible to provide for the coating layer made of a majority of cerium oxides to be deposited by cathodic electrodeposition before or after deposition (whether CVD, or deposition by some other technique, in particular VPA) of an aluminide layer (in particular a nickel aluminide layer).

There follows a description of the preferred characteristics of the coating of the present invention as a function of the specific property(ies) desired for the ceramic coating layer.

Application 1: Anti-Oxidation and/or Anticorrosion at High Temperature

Under such circumstances, a "dried mud" type coating layer is provided that presents one or more of the following preferred arrangements:
- the distance between two adjacent cracks is less than 20 µm;
- said cracks present a width l of less than 10 µm;
- said coating layer presents a nodular microstructure of nanometric and/or micrometric size;
- said coating layer presents a concentration of oxygen vacancies that is less than or equal to $10^{23}/cm^3$ and preferably greater than or equal to $10 \times 10^{20}$ vacancies/$cm^3$, or indeed greater than $30 \times 10^{20}$ vacancies/$cm^3$; and
- said coating layer presents thickness of less than 30 µm.

The composition of the coating layer is as follows:
- in the range 15 at % to 30 at % of cerium oxides;
- in the range 50 at % to 75 at % of oxygen; and
- in the range 0.5 at % to 15 at % nitrogen.

The crystal structure of the coating layer is immaterial.

It is thus possible to use such a part as a thermomechanical part operating in a working environment that is oxidizing and hot, presenting a temperature higher than 500° C.

Since the coating layer presents a certain minimum density of oxygen vacancies (greater than or equal to $10 \times 10^{20}$ vacancies/$cm^3$), sub-stoichiometric compounds are present. Furthermore, the presence of oxygen vacancies enables oxygen to be captured from the environment so as to diffuse to the interface between the substrate and the coating layer, thereby ensuring that an oxide layer forms quickly at this interface, thereby protecting the substrate. Furthermore, this capture of oxygen reduces the partial pressure of oxygen and thus encourages the formation of the most stable oxide ($\alpha$-$Al_2O_3$ alumina for a substrate made up of an alumina-forming alloy).

Application 2: Thermal Barriers

Under such circumstances, a "dried mud" type coating layer is used presenting one or more of the following preferred arrangements:
- the distance between two adjacent cracks lies in the range 20 µm to 50 µm;
- said cracks present a width l of less than 10 µm;
- said coating layer presents a microstructure that is nodular of nanometric and/or micrometric size;
- said coating layer presents a concentration of oxygen vacancies that is less than or equal to $10^{23}/cm^3$, and preferably greater than or equal to $10 \times 10^{20}$ vacancies/$cm^3$, or indeed greater than $30 \times 10^{20}$ vacancies/$cm^3$; and
- said coating layer presents thickness greater than 20 µm.

The composition of the coating layer is as follows:
- in the range 15 at % to 30 at % cerium oxides;
- in the range 50 at % to 75 at % of oxygen; and
- in the range 0.5 at % to 15 at % nitrogen.

The crystal structure of the coating layer is cubic and/or tetragonal, but it is not monoclinic.

It is thus possible to use such a part as a thermomechanical part operating in a working environment that is hot, presenting a temperature higher than 500° C., said coating acting as a thermal barrier for the substrate, the coating layer presenting thermal conductivity of less than 12 watts per meter kelvin ($W \cdot m^{-1} \cdot K^{-1}$), or indeed thermal conductivity less than 5 $W \cdot m^{-1} \cdot K^{-1}$.

It is possible to obtain coating layers that present a concentration that is uniform or that varies gradually in its thickness, for the cerium oxide on its own or as stabilized (doped) by at least one rare earth oxide.

Application 3: Reducing Emissions of Greenhouse Effect Gas

This effect of capturing harmful and polluting species that enables greenhouse gas emissions to be reduced (in particular from airplane engines) stems from the fact that the ceramic/oxide coating layer of the invention obtained by the above-described preferred process is based on cerium oxides, where cerium oxide acts as a catalyst. Because of its composition and because of its high density of vacancies, in particular oxygen vacancies, it is possible to capture gases (such as hydrocarbons, carbon monoxide, nitrogen oxides, soot, and other exhaust gas compounds) and, by means of redox reactions, to eliminate at least some of the harmful and/or polluting compounds, while renewing at least some of the ions suitable for reacting. It is also necessary to mention in parallel the good oxygen storage capacity (OSC) properties of the coating layer obtained by the process since by having oxygen vacancies present it follows that there is a phenomenon of capturing oxygen from the surroundings that acts not only in the context of oxidizing polluting gases, but that also acts by diffusion within the coating layer so as to form an oxide layer that is the most stable thermodynamically.

Under such circumstances, there is a coating layer of the "dried mud" type presenting one or more of the following preferred arrangements:
- the distance between two adjacent cracks is less than 20 µm;
- said cracks present a width l of less than 10 µm;
- said coating layer presents a microstructure that is nodular of nanometric and/or micrometric size;
- said coating layer presents a concentration of oxygen vacancies that is greater than or equal to $10 \times 10^{20}$ vacancies/$cm^3$, and
- said coating layer presents thickness less than 30 µm.

The composition of the coating layer is as follows:
- in the range 15 at % to 30 at % of cerium oxides;
- in the range 50 at % to 75 at % of oxygen; and
- in the range 0.5 at % to 15 at % nitrogen.

The crystal structure of the coating layer is immaterial.

Furthermore, said coating layer preferably presents a microstructure that is nodular (rounded morphology) of nanometric and/or micrometric size, with an active surface area that is not negligible because of the presence of pores and cracks.

It is thus possible to use such a part as a thermomechanical part operating in a hot and oxidizing working environment at a temperature higher than 100° C., said coating layer presenting an effect of capturing harmful species.

Because of the presence of vacancies, it is possible to capture gases, and by means of redox reactions, it is possible to eliminate at least some of the harmful and/or polluting compounds, while renewing at least some of the ions suitable for reacting again. The ceramic coating layer based on oxide(s) has the major advantage of acting on its own as a catalyst because of its composition, and thus because of its density of vacancies, which can be controlled by doping with other cations and by varying their molar fractions. Thus, there is no need to provide a support metal for performing catalysis: this provides a coating of the self-active coating type.

There follows a detailed description of the protocol relating to implementing the preferred fabrication method.

A layer of $CeO_{2-x}$ coating is made on a nickel-based substrate, in particular on a nickel-based superalloy substrate, by implementing steps 1.1 to 1.13.

Preparing the Electrolytic Bath (or Electrolyte):

1.1: dissolving the $Ce(NO_3)_3$, $6H_2O$ salt in water at the desired concentration:

1.2: hermetic storage to avoid contact with air and possible partial oxidation of the metallic cations (applies to cerium);

1.3: preparing the electrolytic bath: this is a beacon filled with 400 microliters (mL) of solution at ambient temperature without stirring; and 1.4: using a conventional electrochemical cell having three electrodes, namely a reference electrode 30, a broad platinum counter-electrode (anode 28) providing a good distribution of current density lines over the entire surface of the sample to be coated, which itself constitutes the working electrode (cathode 26).

Preparing the Part for Coating:

1.5: preparing its surface by sandblasting with alumina $Al_2O_3$ as is typical prior to depositing platinum Pt for vapor phase aluminization, but any other type of preparation need not be excluded (mechanical polishing, electrochemical preparation, etc.);

1.6: degreasing samples in an alcohol solvent, preferably ethanol and rinsing and then drying in hot air ($50°$ C.$<T<200°$ C.); and 1.7: fastening the sample/part via its section (edge) so as to avoid disturbing the formation of the film over its entire surface, using a system that provides electrical contact (such as a contact clamp, etc.), and that is inert (e.g.: Pt) relative to the electrodeposition electrolytic bath.

Electrodeposition:

1.8: connecting the contact clamp to the potentiostat (or galvanostat) serving both to control the setpoint for application (imposed potential or imposed current) and to record the response of the system on being polarized (thus enabling in situ tracking to take place);

1.9: immersing the part for coating in a well-centered position relative to the platinum counter-electrode (in order to obtain a uniform deposit over the entire surface) and at a distance from the reference electrode that is constant and controlled in order to record the response of the system to polarization, always in the same manner as to ensure reproducibility of the measurements performed in situ;

1.10: preferred electrodeposition conditions: time=20 min; $j=-1$ $mA \cdot cm^{-2}$; concentration of the bath=0.1 mol/L;

1.11: at the end of electrodeposition, extracting the part and then rinsing it in water, followed by rinsing for 30 seconds (s) in an alcohol solvent (ethanol) and drying in hot air (as in point 1.6);

1.12: storing for at least 24 h in dry air, preferably in a desiccator containing a substance for capturing humidity from the air (e.g. such as silica gel); and 1.13: heat treatment under an inert argon atmosphere for 1 h at $1050°$ C. with temperature being raised and lowered at a rate of $5°$ C./min.

The characteristics of the coating layer as obtained in this way are as follows:

Morphology and thickness: the coating layer obtained by electrodeposition covers the surface of the substrate in uniform manner with discontinuities in the form of cracks, giving rise to an appearance of the "dried mud" type. The distribution of the cracks is random, with the width of the cracks lying in the range 1 μm to 25 μm and the distance between cracks preferably lying in the range 5 μm to 50 μm. The cracks may pass completely or partially through the entire thickness of the coating layer. The thickness of the coating layer should lie in the range 1 μm to 100 μm. Under the coating layer based on rare earth oxide, it is possible for underlying layers to appear that result from the deposit reacting with the substrate. Their thickness should not exceed that of the coating layer.

Composition: the coating layers comprise in the range 0.10 at % to 35 at % of the elements cerium, possibly together with one or more elements of the lanthanide type and/or yttrium and/or zirconium and/or hafnium, in the range 0.5 at % to 75 at % of oxygen, and in the range 0.5 at % to 30 at % of nitrogen.

Crystal structure: prior to heat treatment, the coating layers comprise crystalline phases of oxides, hydroxides, nitrates, or combinations thereof with the element cerium, possibly also with one or more other lanthanide elements and/or yttrium and/or zirconium and/or hafnium, and a fraction of amorphous phases. After heat treatment, the entire coating layer is crystallized.

Microstructure: the microstructure of the coating layers includes elongate shapes (of the needle type), rounded shapes (of the spherical protuberance or cauliflower type), desert rose type shapes, and plate shapes. Their size does not exceed the inter-crack distance.

Defects: the coating layers include anionic and cationic type vacancy defects, in a variety of proportions (0.5% to 75%).

Analogous characteristics of the coating layer have been obtained by depositing a layer of $CeO_{2-x}$ coating on a substrate (material of the part or coating underlayer):

of nickel aluminide (or on some other type of aluminide); or based on platinum; or nickel silicide (or on some other type of silicide); or constituted by a composite material presenting some minimum amount of electron conductivity (for example a "cermet" having a Co matrix and reinforcement of tungsten carbide).

Other deposition processes may also be used in order to make the ceramic coating layer, in particular any of the prior art deposition techniques mentioned in the introduction of the present patent application.

Thus, various deposition techniques such as electrophoresis, the sol-gel technique, silkscreen printing, application with a paint brush or by immersion, chemical precipitation, spraying, chemical vapor deposition, physical vapor deposition (PVD), or any combination thereof may also be used for making the ceramic coating layer.

For example, with spraying, the same type of solution may be used while adding one or more additives (e.g. such as polyethylenegylcol (PEG), polyvinyl alcohol (PVA)) in order to increase the viscosity of the solution and improve the wettability (contact) between the substrate and the solution containing the rare earth for depositing, and also making the deposit more plastic and preventing it from flaking on the surface. Additional heat treatment raising the temperature in stages under an atmospheric that is oxidizing (at least a little) is also necessary in order to consolidate the coating, to facilitate anchoring the sprayed deposit on the substrate, and to control the chemical composition, the morphology, the microstructure, the crystal structure, and the quantity of defects present in the deposited layers.

The invention claimed is:

1. A part comprising a substrate made of an electron-conducting material, wherein a surface of the substrate has a coating on at least a portion of the surface of the substrate, the coating comprising a ceramic layer comprising a cerium oxide,
wherein:
the ceramic layer has a concentration of oxygen vacancies greater than or equal to $1\times10^{17}/cm^3$,
a surface of the ceramic layer has a plurality of cracks, and
the ceramic layer has a thickness of 5 µm to 100 µm.

2. The part of claim 1, wherein a distance between two adjacent cracks is 5 µm to 50 µm.

3. The part of claim 1, wherein the ceramic layer comprises:
0.5 at % to 35 at % of a cerium oxide;
0.5 at % to 75 at % oxygen; and
0.5 at % to 30 at % nitrogen.

4. The part of claim 1, wherein the ceramic layer further comprises a metallic oxyhydroxide of formula MO.OH, where M is at least one metal selected from the group consisting of a lanthanide, yttrium, zirconium, and hafnium.

5. The part of claim 1, wherein the substrate comprises at least one selected from the group consisting of a superalloy, a nickel-based superalloy, a cobalt-based superalloy, titanium, a titanium alloy, an intermetallic aluminide compound, an intermetallic silicide compound, a metallic matrix composite, a ceramic matrix composite, and an organic matrix composite.

6. The part of claim 1, wherein a distance between two adjacent cracks is 20 µm to 50 µm.

7. The part of claim 1, wherein the ceramic layer has a thickness greater than 20 µm.

8. The part of claim 1, wherein a distance between two adjacent cracks is less than 20 µm.

9. The part of claim 1, wherein the ceramic layer has a nodular microstructure that has a nanometric or micrometric size.

10. The part of claim 1, wherein the ceramic layer has a thickness less than 30 µm.

11. The part of claim 1, wherein the ceramic layer comprises:
15 at % to 30 at % of a cerium oxide;
50 at % to 75 at % oxygen; and
0.5 at % to 15 at % nitrogen.

12. The part of claim 1, wherein the ceramic layer has a concentration of oxygen vacancies greater than or equal to $10\times10^{20}/cm^3$.

13. The part of claim 1, wherein the substrate comprises at least one aluminide selected from the group consisting of a nickel aluminide, a cobalt aluminide, an iron aluminide, a titanium aluminide, a ruthenium aluminide, and a platinum aluminide.

14. The part of claim 1, wherein the substrate comprises a molybdenum silicide, an iron silicide, or both.

* * * * *